United States Patent
Hong (10) Patent No.: US 11,066,873 B2
(45) Date of Patent: Jul. 20, 2021

(54) SLAT ANGLE ADJUSTMENT MECHANISM FOR WINDOW BLIND

(71) Applicants: CHING FENG HOME FASHIONS CO., LTD., Fuxing Township, Changhua County (TW); Wei-Shun Hong, Xihu Township, Changhua County (TW)

(72) Inventor: Wei-Shun Hong, Xihu Township, Changhua County (TW)

(73) Assignees: CHING FENG HOME FASHIONS CO., LTD., Changhua County (TW); Wei-Shun Hong, Xihu Township (TW)

( * ) Notice: Subject to any disclaimer, the term of this patent is extended or adjusted under 35 U.S.C. 154(b) by 285 days.

(21) Appl. No.: 16/149,414

(22) Filed: Oct. 2, 2018

(65) Prior Publication Data

US 2019/0032401 A1   Jan. 31, 2019

Related U.S. Application Data

(63) Continuation-in-part of application No. 15/807,553, filed on Nov. 8, 2017, now Pat. No. 10,513,883.

(30) Foreign Application Priority Data

Jun. 29, 2017   (TW) .................................. 106209505

(51) Int. Cl.
  *E06B 9/307* (2006.01)
  *F16H 57/00* (2012.01)
  (Continued)

(52) U.S. Cl.
  CPC .............. *E06B 9/307* (2013.01); *E06B 9/322* (2013.01); *F16H 57/0025* (2013.01);
  (Continued)

(58) Field of Classification Search
  CPC .... E06B 9/322; E06B 9/307; E06B 2009/285; F16H 57/0025; F16H 57/021;
  (Continued)

(56) References Cited

U.S. PATENT DOCUMENTS 2,877,658 A * 3/1959 Anthony ................... F16H 1/16
  74/409
4,676,292 A * 6/1987 Valle ....................... E06B 9/307
  160/176.1 R
(Continued)

FOREIGN PATENT DOCUMENTS

TW       M551651 U     11/2017

*Primary Examiner* — Daniel D Yabut
(74) *Attorney, Agent, or Firm* — Muncy, Geissler, Olds & Lowe, P C.

(57) ABSTRACT

A slat angle adjustment mechanism adapted for use with slats of a Venetian blind includes a body shell and a transmission unit. The transmission unit includes a transmission gear set and a retractable member. The transmission gear set has a gear and a screw. A position-limiting hole of the gear corresponds in position to a second through hole of the body shell. The retractable member connects to the extendible segment of the screw and undergoes reciprocating motion along the extendible segment of the screw. Pulling the retractable member from an initial first position of the extendible segment of the screw to a second position of the extendible segment of the screw allows a rib of the body shell to be confined to a limiting portion of the retractable member. Therefore, the slat angle adjustment mechanism is capable of extension, retraction, engagement and fixation.

16 Claims, 5 Drawing Sheets

(51) Int. Cl.
  *E06B 9/28*      (2006.01)
  *F16H 57/023*    (2012.01)
  *F16H 57/02*     (2012.01)
  *E06B 9/322*     (2006.01)
  *F16H 57/021*    (2012.01)
  *F16H 57/039*    (2012.01)

(52) U.S. Cl.
  CPC ...... *F16H 57/021* (2013.01); *E06B 2009/285* (2013.01); *F16H 57/023* (2013.01); *F16H 57/039* (2013.01); *F16H 2057/0213* (2013.01); *F16H 2057/02039* (2013.01)

(58) Field of Classification Search
  CPC ................. F16H 57/023; F16H 57/039; F16H 2057/02039; F16H 2057/0213; F16D 1/101; F16D 1/108; F16D 1/116; F16D 2001/102; F16D 2001/103
  See application file for complete search history.

(56) References Cited

U.S. PATENT DOCUMENTS

| | | | |
|---|---|---|---|
| 6,325,133 B1 * | 12/2001 | Lin | E06B 9/322 160/177 R |
| 9,376,859 B1 * | 6/2016 | DeWard | E06B 9/307 |
| 2018/0058142 A1 * | 3/2018 | Wang | E06B 9/322 |
| 2018/0363709 A1 * | 12/2018 | Chen | F16D 1/108 |

* cited by examiner

SLAT ANGLE ADJUSTMENT MECHANISM FOR WINDOW BLIND

CROSS-REFERENCE TO RELATED APPLICATION

This application is a continuation-in-part of application Ser. No. 15/807,553, filed on Nov. 8, 2017.

BACKGROUND OF THE INVENTION

1. Technical Field

The present disclosure relates to a slat angle adjustment mechanism and, more particularly, to a slat angle adjustment mechanism adapted for use with slats of a Venetian blind and capable of engagement and fixation.

2. Description of Related Art

According to prior art, the angle of slats of a Venetian blind is adjusted with a slat angle adjustment mechanism connected to the slats. However, every conventional slat angle adjustment mechanism is fixed in place; as a result, the point of connection of the conventional slat angle adjustment mechanism and every slat of the Venetian blind is likely to crack during a pre-delivery packing process.

In an attempt to enhance the ease of packing and delivering a slat angle adjustment mechanism for use with slats of a Venetian blind, Taiwan patent M551651U discloses a slat angle adjustment mechanism 10 for a Venetian blind slat, comprising a body shell 20 and a transmission unit 30 received in an accommodation chamber 21 of the body shell 20. The transmission unit 30 comprises a transmission gear set 40 and a retractable member 50 connected to the transmission gear set 40. The transmission gear set 40 has a gear 41 and a screw rod 43 meshing with the gear 41. The retractable member 50 is connected to an extendible segment 431 of the screw rod 43 and undergoes reciprocating motion along the extendible segment 431 of the screw rod 43. The retractable member 50 has a stop flange 51 and a ring hanger 53. When the user pulls the ring hanger 53 of the retractable member 50, the retractable member 50 which has extended to the body shell 20 returns to its initial position because of the displacement of the extendible segment 431 of the screw rod 43, thereby reducing greatly the chance that the ring hanger 53 of the retractable member 50 of the slat angle adjustment mechanism 10 for the Venetian blind slat will crack during a packing process and thus enhancing significantly the ease of packing and delivery.

As mentioned before, a user's pulling the ring hanger 53 of the retractable member 50 allows the retractable member 50 to move from the initial position of the extendible segment 431 of the screw rod 43 to a predetermined position. This not only further allows the ring hanger 53 of the retractable member 50 to extend to the body shell 20 once again, but also further allows the stop flange 51 of the retractable member 50 to be stopped at a stop portion 27 of the body shell 20, thereby allowing an adjustment operating member 97 of a Venetian blind 90 to be hung on the ring hanger 53 of the retractable member 50.

However, the user's clockwise or counterclockwise rotation of the adjustment operating member 97 of the Venetian blind 90 not only causes the gear 41 of the transmission gear set 40 to rotate clockwise or counterclockwise because the retractable member 50 is connected to the extendible segment 431 of the screw rod 43, but also causes the ring hanger 53 of the retractable member 50 of the transmission unit 30, which has extended to the body shell 20, to move once again and return to the initial position because the user exerts a clockwise or counterclockwise rotating force on the adjustment operating member 97 of the Venetian blind 90. The aforesaid phenomena bring inconvenience to the user in the course of adjusting the adjustment operating member 97 of the Venetian blind 90.

Therefore, it is imperative to overcome the aforesaid drawbacks of the prior art.

BRIEF SUMMARY OF THE INVENTION

In view of the aforesaid drawbacks of the prior art, it is an objective of the present disclosure to provide a slat angle adjustment mechanism adapted to adjust slats of a Venetian blind and augment stability of operation of the slat angle adjustment mechanism by rendering the slat angle adjustment mechanism capable of extension, retraction, engagement and fixation.

In order to achieve the above and other objectives, the present disclosure provides a slat angle adjustment mechanism adapted to adjust slats of a Venetian blind. The slat angle adjustment mechanism essentially comprises a body shell and a transmission unit.

The body shell has an accommodation chamber, a first through hole, a second through hole and a stop portion. The first through hole is in communication with the accommodation chamber. The second through hole penetrates the body shell body and is in communication with the accommodation chamber, thus achieving communication between the first through hole and the second through hole. The stop portion extends radially and inward from an enclosing wall of the accommodation chamber and positioned proximate to the first through hole. The stop portion has at least one rib.

The transmission unit is received in the accommodation chamber of the body shell. The transmission unit comprises a transmission gear set and a retractable member connected to the transmission gear set. The transmission gear set has a gear and a screw meshing with the gear. The gear has a position-limiting hole. The position-limiting hole corresponds in position to the second through hole of the body shell. The retractable member is connected to an extendible segment of the screw and undergoes reciprocating motion along the extendible segment of the screw. The retractable member has a ring hanger and a limiting portion. The limiting portion is formed by sinking the body of the retractable member inward and radially.

Pulling the ring hanger of the retractable member causes the retractable member to move from an initial first position of the extendible segment of the screw to a second position of the extendible segment of the screw and thus allows the at least one rib of the stop portion of the body shell to be confined to the limiting portion of the retractable member. Pulling the ring hanger of the retractable member causes the retractable member to move from the second position of the extendible segment of the screw to the first position of the extendible segment of the screw and thus allows the at least one rib of the stop portion of the body shell to be stopped at the ring hanger of the retractable member.

Preferably, the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

Preferably, a stop flange is disposed at one end of the retractable member and positioned distal to the ring hanger. The stop flange is formed by extending the body of the retractable member radially and outward; hence, the limiting portion is disposed between the stop flange and the ring hanger, wherein pulling the ring hanger of the retractable member causes the retractable member to move from the initial first position of the extendible segment of the screw to the second position of the extendible segment of the screw and allows the stop flange of the retractable member to be blocked at the stop portion of the body shell.

Preferably, the retractable member is a sleeve for fitting around the extendible segment of the screw and has a hole. The cross section of the hole matches the cross section of the extendible segment of the screw and thus is linear, cross-shaped, triangular or polygonal.

DETAILED DESCRIPTION OF THE INVENTION

Structural features and anticipated advantages thereof of the present disclosure are hereunder illustrated by embodiments and depicted with accompanying drawings. Identical reference numerals used herein denote identical or similar elements, components, objects, structures, systems, frameworks, devices, process flows, methods or steps.

Figure 1:
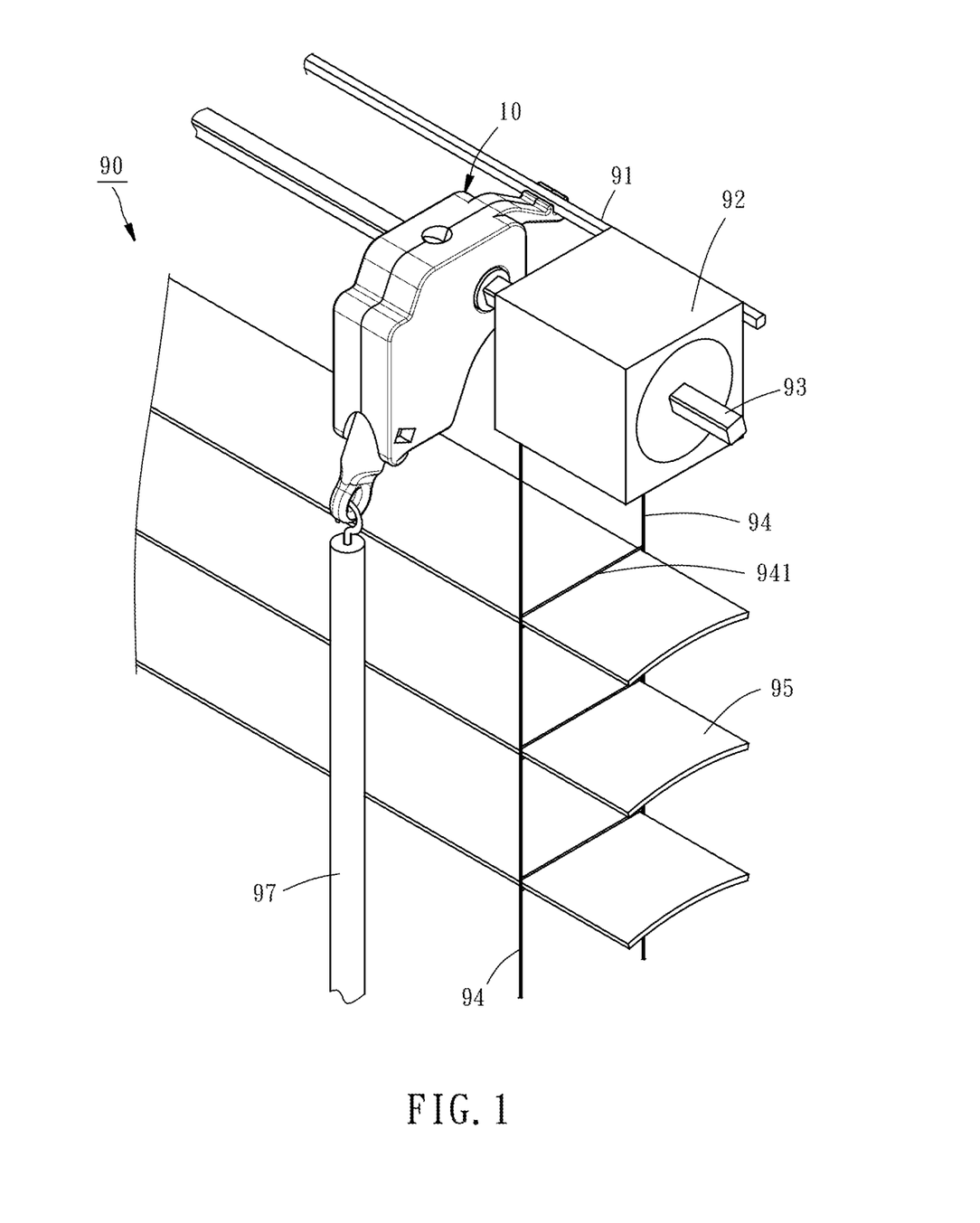
FIG. 1 is a schematic view of application of the first preferred embodiment of the present disclosure.

Referring to FIG. 1, the first preferred embodiment of the present disclosure provides a slat angle adjustment mechanism 10 adapted to be mounted on a Venetian blind 90. The Venetian blind 90 comprises a support member 91, a cord-controlling element 92, a slat linking member 93, two lift cords 94, a plurality of slats 95 and an adjustment operating member 97. One end of the slat angle adjustment mechanism 10 is engaged with and fixed to the support member 91. The slat linking member 93 is penetratingly fixed to the body of the slat angle adjustment mechanism 10 and the cord-controlling element 92. The slat linking member 93 and the plurality of slats 95 are parallel. One end of any one of the lift cords 94 is connected to the cord-controlling element 92, and the other end of the lift cord 94 extends vertically and connects to the plurality of slats 95. The two lift cords 94 are connected by a daughter string 941; hence, the two lift cords 94 disposed at two opposing ends of the plurality of slats 95 are connected by one said daughter string 941. One end of the adjustment operating member 97 is hung on the slat angle adjustment mechanism 10. When the adjustment operating member 97 is rotated and adjusted, the slat linking member 93 is rotated because of the slat angle adjustment mechanism 10; meanwhile, rotation of the slat linking member 93 causes the cord-controlling element 92 to drive the rotation of the two lift cords 94 such that the plurality of slats 95 shuts or opens gradually in accordance with the direction in which the two lift cords 94 rotate, thereby allowing a user to watch outdoor views or take a rest invisibly at will.

Referring to FIG. 1 through FIG. 4, the slat angle adjustment mechanism 10 essentially comprises a body shell 20 and a transmission unit 30.

Figure 2:
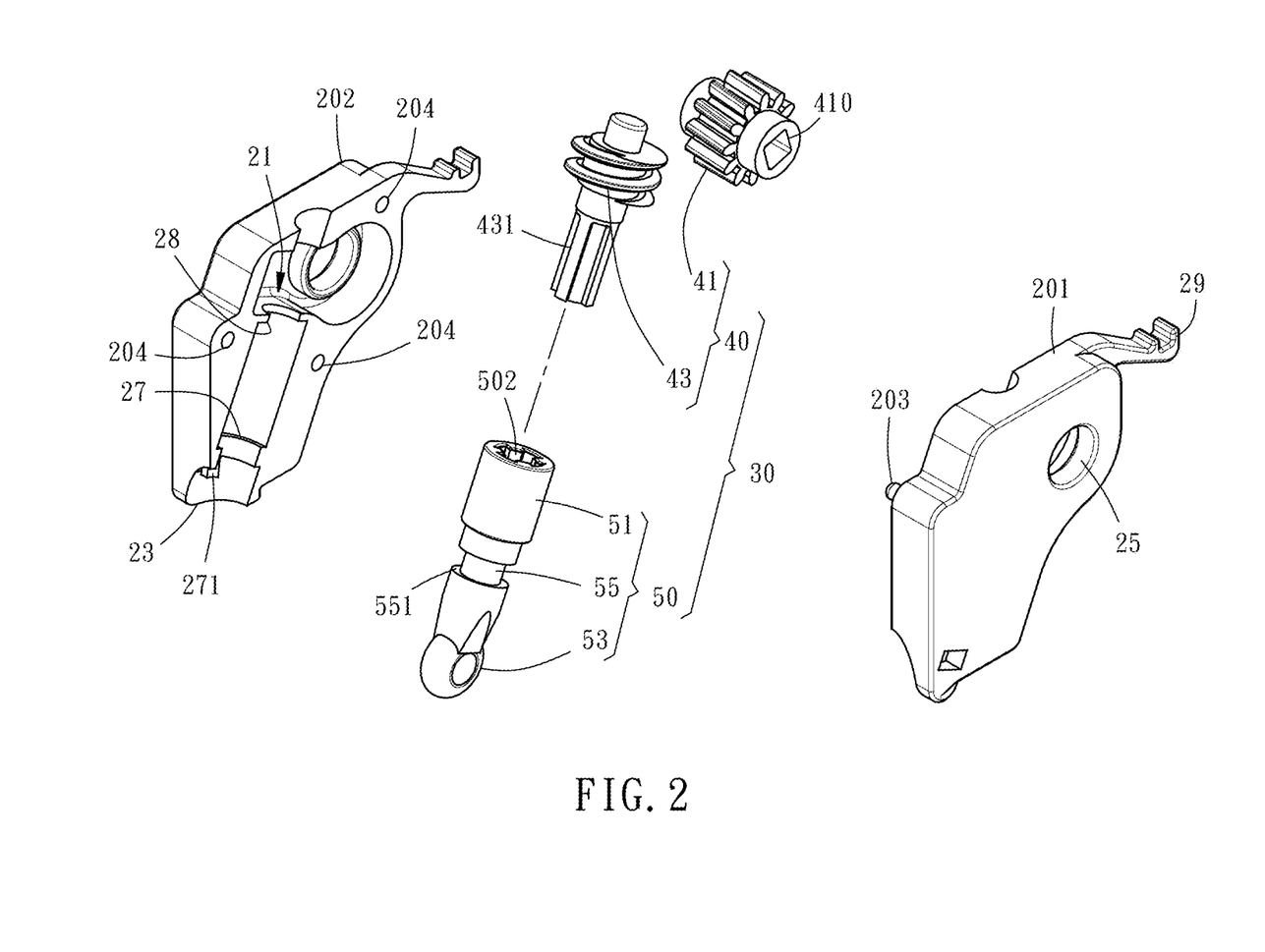
FIG. 2 is an exploded view of a slat angle adjustment mechanism in the first preferred embodiment of the present disclosure.
Figure 3:
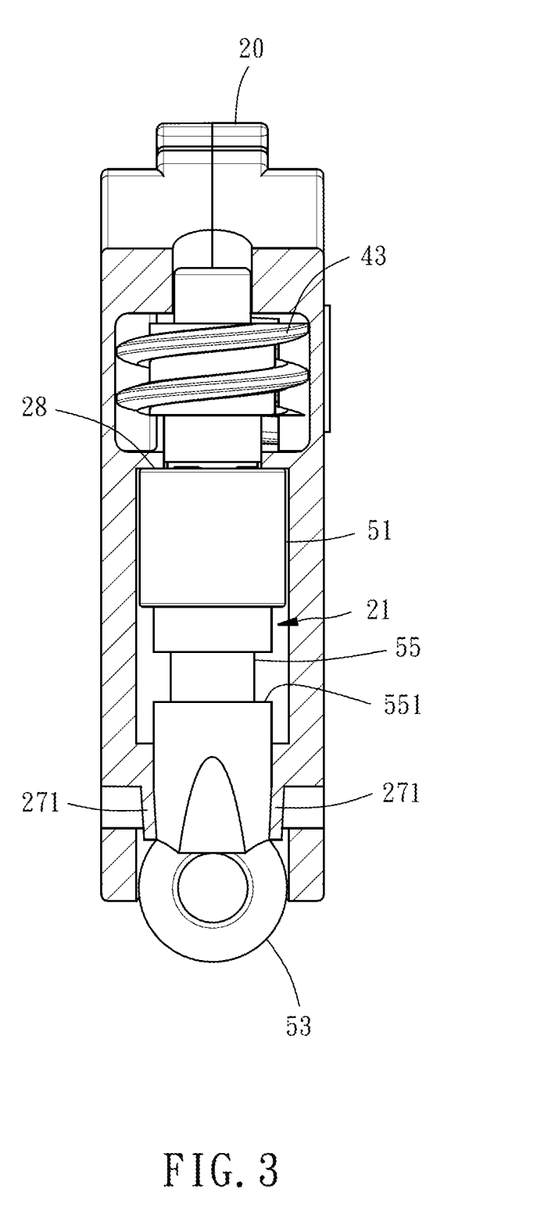
FIG. 3 is a cross-sectional view of a portion of the slat angle adjustment mechanism in the first preferred embodiment of the present disclosure, showing schematically its application at a first position.
Figure 4:
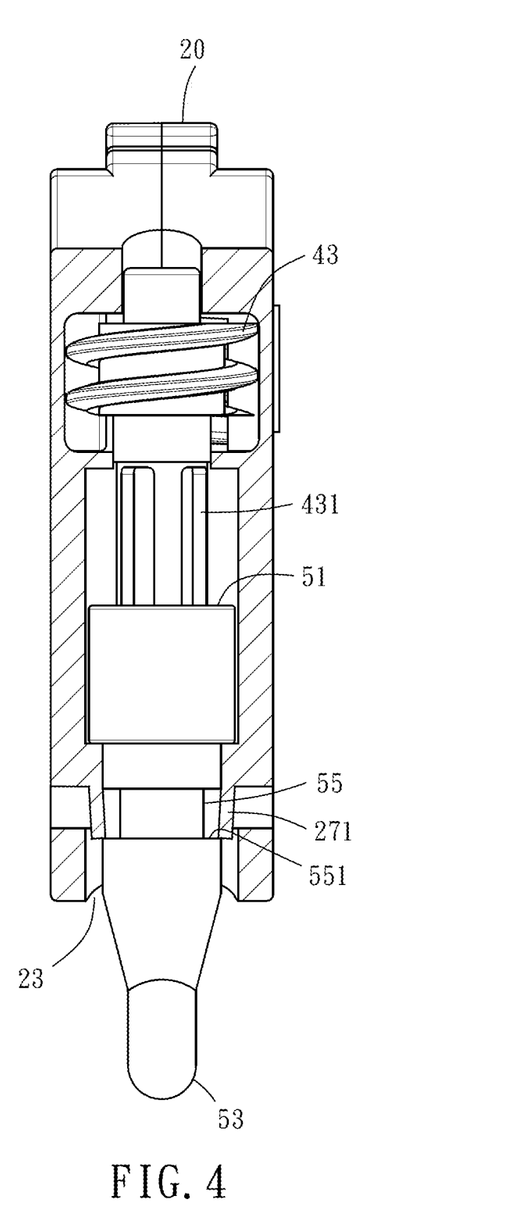
FIG. 4 is a cross-sectional view of a portion of the slat angle adjustment mechanism in the first preferred embodiment of the present disclosure, showing schematically its application at a second position.

The body shell 20 essentially comprises a first shell member 201 and a second shell member 202 corresponding in position to the first shell member 201 and forms an accommodation chamber 21 therein. Preferably, three locating pins 203 are protrudingly disposed on the inner wall of the first shell member 201 and correspond in position to three limiting recesses 204 concavely disposed on the inner wall of the second shell member 202, respectively. After the first shell member 201 and the second shell member 202 have been put together, the locating pins 203 of the first shell member 201 correspond in position to, are inserted into, and are fixed to, the limiting recesses 204 of the second shell member 202, respectively.

The body shell 20 further has a first through hole 23, a second through hole 25, a stop portion 27, a coupling flange 28 and an engaging portion 29. The first through hole 23 is in communication with the accommodation chamber 21. The second through hole 25 penetrates the body shell 20 body and is in communication with the accommodation chamber 21, so as to achieve communication between the first through hole 23 and the second through hole 25. Preferably, the opening direction of the first through hole 23 and the opening direction of the second through hole 25 cross each other. The stop portion 27 extends radially and inward from the enclosing wall of the accommodation chamber 21 to form a protruding wall and is positioned proximate to the first through hole 23. The stop portion 27 further has two opposing ribs 271 extending toward the first through hole 23. The coupling flange 28 extends radially and inward from the enclosing wall of the accommodation chamber 21 to form a protruding wall and is positioned proximate to the second through hole 25. One end of the engaging portion 29 is connectingly disposed at the body shell 20 and positioned proximate to the second through hole 25 of the body shell 20. The engaging portion 29 is engaged with and fixed to the support member 91 of the Venetian blind 90. The ribs 271 of the stop portion 27 are in the number of at least one and are resilient.

The transmission unit 30 is received in the accommodation chamber 21 of the body shell 20. The transmission unit 30 comprises a transmission gear set 40 and a retractable member 50 connected to the transmission gear set 40.

The transmission gear set 40 has a gear 41 and a screw rod 43 meshing with the gear 41. The gear 41 has a position-limiting hole 410. The position-limiting hole 410 corresponds in position to the second through hole 25 of the body shell 20; hence, the slat linking member 93 of the Venetian blind 90 is penetratingly disposed at the second through hole 25 of the body shell 20 and the position-limiting hole 410 of the gear 41 before being confined and fixed in place. The screw rod 43 has an extendible segment 431. The cross section of the extendible segment 431 is cross-shaped, but may also be linear, triangular or polygonal, and thus the present disclosure is not limited thereto.

The retractable member 50 is connected to the extendible segment 431 of the screw rod 43 and undergoes reciprocating motion along the extendible segment 431 of the screw rod 43. A stop flange 51 is disposed at one end of the retractable member 50 and formed by extending the body of the retractable member 50 radially and outwardly. A ring hanger 53 is disposed at the other end of the retractable member 50. The adjustment operating member 97 of the Venetian blind 90 is hung on the ring hanger 53. A limiting portion 55 is disposed between the stop flange 51 and the ring hanger 53. The limiting portion 55 is formed by sinking the body of the retractable member 50 inward and radially. The retractable member 50 is a sleeve. The retractable member 50 has an axial hole 502. The cross section of the axial hole 502 matches the cross section of the extendible segment 431 of the screw rod 43 and thus is also cross-shaped. When the axial hole 502 of the retractable member 50 fits around the extendible segment 431 of the screw rod 43, the retractable member 50 and the screw rod 43 mesh with each other.

Anticipated advantages of the slat angle adjustment mechanism 10 in the first preferred embodiment of the present disclosure are as follows:

First, the slat angle adjustment mechanism 10 is capable of extension, retraction, engagement and fixation. Referring to FIG. 1 through FIG. 4, to mount the slat angle adjustment mechanism 10 on the Venetian blind 90, a user must ensure that the slat linking member 93 of the Venetian blind 90 is penetratingly disposed at the second through hole 25 of the body shell 20 of the slat angle adjustment mechanism 10 and the position-limiting hole 410 of the gear 41 and then confined and fixed in place. Afterward, the user must ensure that the engaging portion 29 of the slat angle adjustment mechanism 10 is engaged with and fixed to the support member 91. Afterward, the users pulls the ring hanger 53 of the retractable member 50 such that the retractable member 50 moves from an initial first position of the extendible segment 431 of the screw rod 43 to a second position of the extendible segment 431 of the screw rod 43, so as to not only allow the ring hanger 53 of the retractable member 50 to protrude and reach the first through hole 23 of the body shell 20, but also allow the stop flange 51 of the retractable member 50 to be stopped at the stop portion 27 of the body shell 20. Preferably, referring to FIG. 4, the two ribs 271 (which are resilient) of the stop portion 27 are each confined to the limiting portion 55 of the retractable member 50. Preferably, terminal ends of the two ribs 271 of the stop portion 27 are stopped at an annular shoulder surface 551 of the limiting portion 55 such that the retractable member 50 is engagedly fixed in place. Afterward, the adjustment operating member 97 of the Venetian blind 90 is hung on the ring hanger 53 of the retractable member 50.

The user's clockwise or counterclockwise rotation of the adjustment operating member 97 of the Venetian blind 90 indirectly drives the gear 41 of the transmission gear set 40 to rotate clockwise or counterclockwise, because the axial hole 502 of the retractable member 50 fits around and meshes with the extendible segment 431 of the screw rod 43; meanwhile, the slat linking member 93 of the Venetian blind 90 follows suit and rotates clockwise or counterclockwise such that the two lift cords 94 connected to the cord-controlling element 92 and the plurality of slats 95 connected to the two lift cords 94 shut or open gradually. Preferably, when the user exerts a clockwise or counterclockwise rotation force on the adjustment operating member 97 of the Venetian blind 90, the retractable member 50 does not undergo displacement again, because the two ribs 271 of the stop portion 27 of the body shell 20 are confined to and stopped at the annular shoulder surface 551 of the limiting portion 55 of the retractable member 50. Therefore, the slat angle adjustment mechanism 10 is rendered capable of extension, retraction, engagement and fixation.

Second, the slat angle adjustment mechanism 10 is capable of clamping. Referring to FIG. 1 through FIG. 4, when the user separates the adjustment operating member 97 of the Venetian blind 90 and the retractable member 50 of the slat angle adjustment mechanism 10 and exerts an upward force with the ring hanger 53 of the retractable member 50 again until the force overcomes the force under which terminal ends of the two ribs 271 of the stop portion 27 of the body shell 20 are stopped at the annular shoulder surface 551 of the limiting portion 55, and thus the two ribs 271 can exit the limiting portion 55. Afterward, the user can continue pulling the ring hanger 53 of the retractable member 50 to move the retractable member 50 from the second position of the extendible segment 431 of the screw rod 43 to the first position of the extendible segment 431 of the screw rod 43 and hide the retractable member 50 in the accommodation chamber 21 of the body shell 20, allowing the ring hanger 53 of the retractable member 50 to be slightly exposed from the first through hole 23 of the body shell 20. Preferably, the two ribs 271 of the stop portion 27 of the body shell 20 are stopped at the ring hanger 53 of the retractable member 50, so as to clamp the ring hanger 53 of the retractable member 50.

Figure 5:
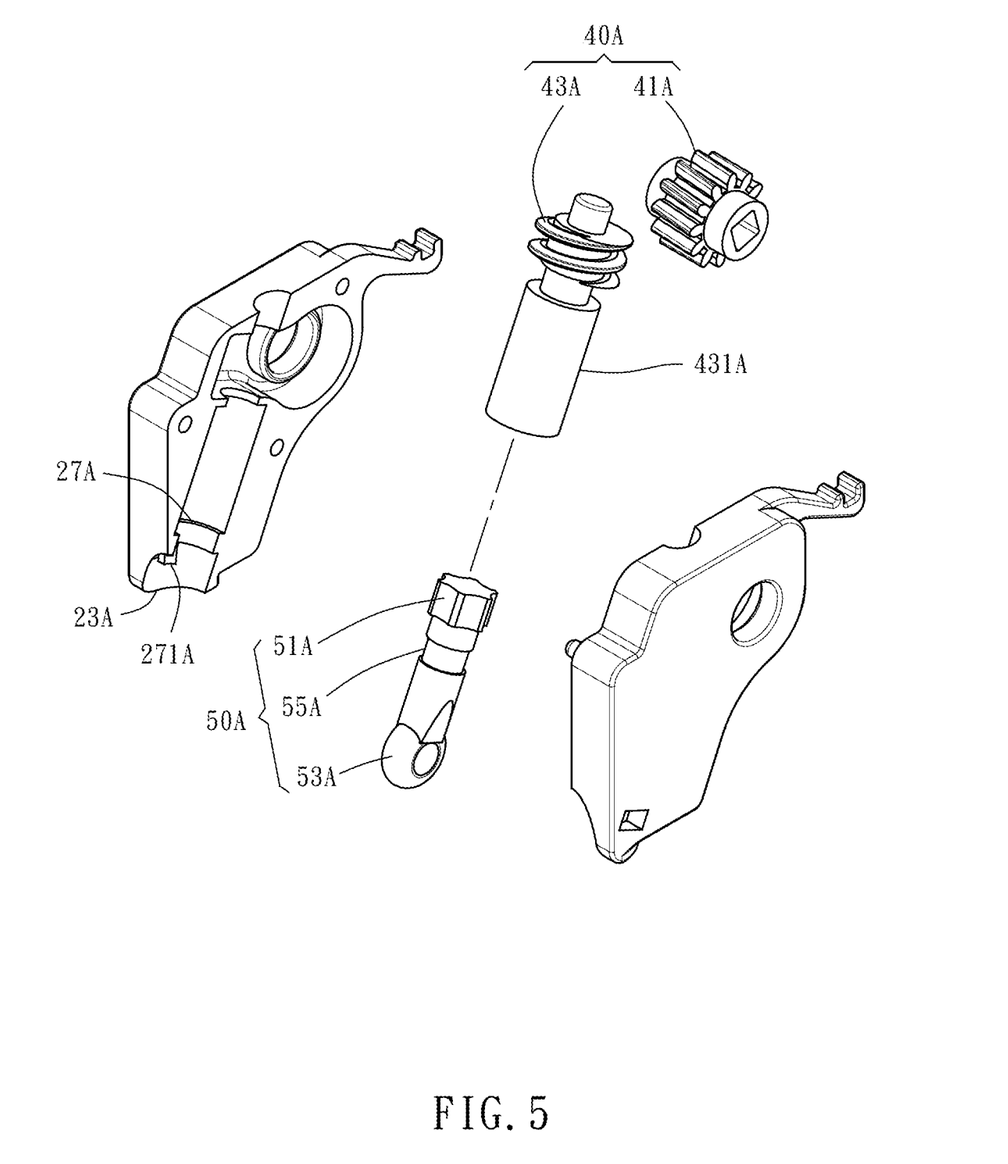
FIG. 5 is an exploded view of a slat angle adjustment mechanism in the second preferred embodiment of the present disclosure.
Figure 6:
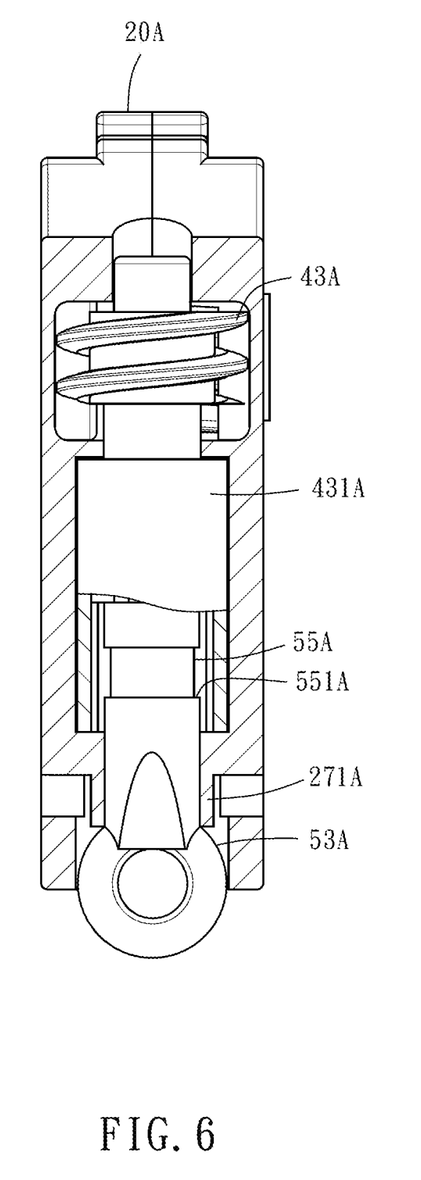
FIG. 6 is a cross-sectional view of a portion of the slat angle adjustment mechanism in the second preferred embodiment of the present disclosure, showing schematically its application at a first position.
Figure 7:
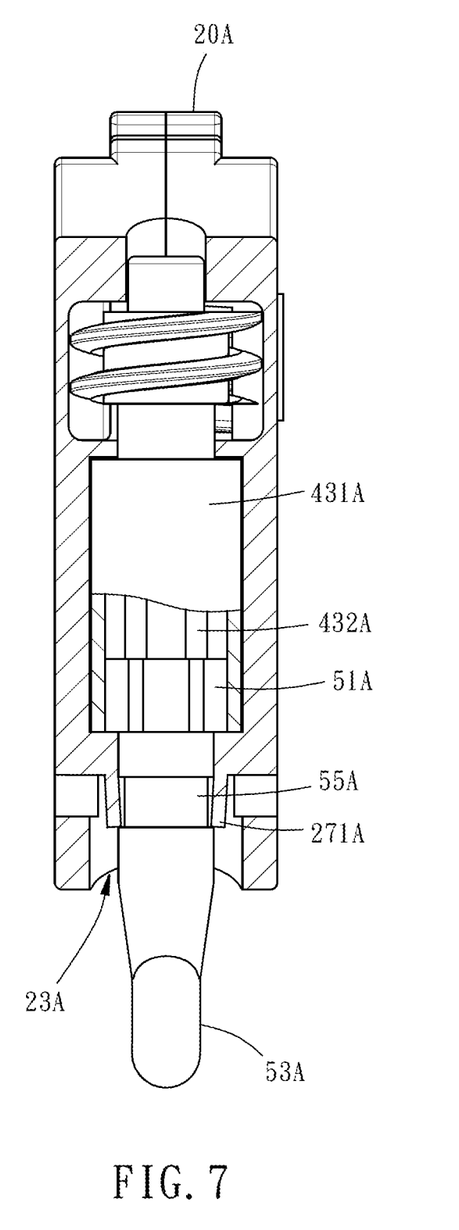
FIG. 7 is a cross-sectional view of a portion of the slat angle adjustment mechanism in the second preferred embodiment of the present disclosure, showing schematically its application at a second position.

Referring to FIG. 5 through FIG. 7, a slat angle adjustment mechanism adapted to be mounted on a Venetian blind according to the second preferred embodiment of the present disclosure is substantially identical to its counterpart disclosed in the first preferred embodiment in terms of essential structural features except for structural features described below.

The gear 41A of the transmission gear set 40A meshes with the screw rod 43A. The extendible segment 431A of the screw rod 43A is a sleeve. The cross section of an inner perimeter 432A of the extendible segment 431A is cross-shaped and may also be linear, triangular or polygonal. The cross section of a stop flange 51A of the retractable member 50A matches the cross section of the inner perimeter 432A of the extendible segment 431A of the screw rod 43A and thus is also cross-shaped. The retractable member 50A is penetratingly disposed at the extendible segment 431A of the screw rod 43A.

Likewise, the stop portion 27A of the body shell 20A extends radially and inward from the enclosing wall of the accommodation chamber 21A to form a protruding wall positioned proximate to the first through hole 23A. The stop portion 27A has two opposing ribs 271A extending toward the first through hole 23A. The limiting portion 55A disposed between the stop flange 51A and the ring hanger 53A is formed by sinking the body of the retractable member 50A radially and inward.

The extendible segment 431A of the screw rod 43A fits into the axial hole 502 of the retractable member 50A such that the screw rod 43A and the retractable member 50A mesh with each other. The retractable member 50A undergoes reciprocating motion along the extendible segment 431A of the screw rod 43A. Preferably, the user pulls the ring hanger 53A of the retractable member 50A to move the retractable member 50A from the initial first position of the extendible segment 431A of the screw rod 43A to the second position of the extendible segment 431A of the screw rod 43A; meanwhile, the stop flange 51A of the retractable member 50A can be blocked at the stop portion 27A of the body shell 20A. Preferably, referring to FIG. 5 and FIG. 7, the two ribs 271A of the stop portion 27A are confined to the limiting portion 55A of the retractable member 50A. Preferably, terminal ends of the two ribs 271A of the stop portion 27A are stopped at an annular shoulder surface 551A of the limiting portion 55A, and thus the retractable member 50A is engagedly fixed in place. Therefore, the slat angle adjustment mechanism is rendered capable of extension, retraction, engagement and fixation.

Persons skilled in the art understand that the detailed description above and the embodiments presented above are merely illustrative of the structures, methods, process flows and anticipated advantages thereof of the present disclosure rather than restrictive of the scope of the claims of the present disclosure, and understand that replacements of or variations in the other equivalent elements, components, objects, structures, devices, methods, and process flows are deemed falling within the claims of the present disclosure.

What is claimed is:

1. A slat angle adjustment mechanism adapted for use with a Venetian blind, comprising:
    a body shell having an accommodation chamber, a first through hole, a second through hole and a stop portion, the first through hole being in communication with the accommodation chamber, the second through hole penetrating a body of the body shell and being in communication with the accommodation chamber, thus achieving communication between the first through hole and the second through hole, the stop portion extending radially and inward from an enclosing wall of the accommodation chamber and positioned proximate to the first through hole, the stop portion having at least one rib, which extends toward the first through hole; and
    a transmission unit received in the accommodation chamber of the body shell and comprising a transmission gear set and an retractable member connected to the transmission gear set, the transmission gear set having a gear and a screw meshing with the gear, the gear having a position-limiting hole, the position-limiting hole corresponding in position to the second through hole of the body shell, with the retractable member connected to an extendible segment of the screw and undergoing reciprocating motion along the extendible segment of the screw, the retractable member having a ring hanger and a limiting portion, the limiting portion being formed by sinking a body of the retractable member inward and radially;
    wherein pulling the ring hanger of the retractable member causes the retractable member to move from an initial first position of the extendible segment of the screw to a second position of the extendible segment of the screw and thus allows the at least one rib of the stop portion of the body shell to be confined to the limiting portion of the retractable member, and pushing the ring hanger of the retractable member causes the retractable member to move from the second position of the extendible segment of the screw to the first position of the extendible segment of the screw and thus allows the at least one rib of the stop portion of the body shell to be stopped at the ring hanger of the retractable member.

2. The slat angle adjustment mechanism of claim 1, wherein a stop flange is disposed at an end of the retractable member and positioned distal to the ring hanger, the stop flange being formed by extending the body of the retractable member radially and outward such that the limiting portion is disposed between the stop flange and the ring hanger, wherein pulling the ring hanger of the retractable member causes the retractable member to move from the initial first position of the extendible segment of the screw to the second position of the extendible segment of the screw and allows the stop flange of the retractable member to be blocked at the stop portion of the body shell.

3. The slat angle adjustment mechanism of claim 2, wherein the retractable member is a sleeve for fitting around the extendible segment of the screw.

4. The slat angle adjustment mechanism of claim 3, wherein the retractable member has a hole with a cross section matching a cross section of the extendible segment of the screw, the cross sections being linear, cross-shaped, triangular or polygonal.

5. The slat angle adjustment mechanism of claim 4, wherein the body shell further has an coupling flange positioned proximate to the screw of the transmission gear set such that the stop flange of the retractable member is confined to the coupling flange of the body shell by pushing the ring hanger of the retractable member and moving the retractable member from the second position of the extendible segment of the screw to the first position of the extendible segment of the screw.

6. The slat angle adjustment mechanism of claim 5, wherein the coupling flange extends radially and inward from the enclosing wall of the accommodation chamber.

7. The slat angle adjustment mechanism of claim 6, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

8. The slat angle adjustment mechanism of claim 5, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

9. The slat angle adjustment mechanism of claim 4, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

10. The slat angle adjustment mechanism of claim 3, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

11. The slat angle adjustment mechanism of claim 2, wherein the extendible segment of the screw is a sleeve for fitting around the retractable member.

12. The slat angle adjustment mechanism of claim 11, wherein a cross section of an inner perimeter of the extendible segment of the screw matches a cross section of the stop flange of the retractable member, the cross sections being linear, cross-shaped, triangular or polygonal.

13. The slat angle adjustment mechanism of claim 12, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

14. The slat angle adjustment mechanism of claim 11, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

15. The slat angle adjustment mechanism of claim 2, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

16. The slat angle adjustment mechanism of claim 1, wherein the limiting portion of the retractable member of the transmission unit has a shoulder surface, and pulling the ring hanger of the retractable member causes the retractable member to move from the initial first position of the extendible segment of the screw to the second position of the extendible segment of the screw, allows the at least one rib of the stop portion of the body shell to be confined to the limiting portion of the retractable member, and allows a terminal end of the at least one rib of the stop portion to be stopped at the shoulder surface of the limiting portion.

* * * * *